United States Patent [19]

Owusu-Ansah et al.

[11] Patent Number: 5,902,622
[45] Date of Patent: *May 11, 1999

[54] NATURAL HEAT STABLE FLAVORINGS FOR BAKERY APPLICATIONS

[75] Inventors: Yaw J. Owusu-Ansah, Saskatoon; Richard Green, Spruce Grove, both of Canada

[73] Assignee: Konstantinos Poulgouras, Saskatoon, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,067

[22] Filed: Jun. 4, 1996

[51] Int. Cl.$^6$ .............................. A23L 1/28; A23L 1/221; A23L 1/222

[52] U.S. Cl. ..................... 426/429; 426/430; 426/533; 426/534; 426/650; 426/655

[58] Field of Search ...................................... 426/615, 632, 426/638, 640, 646, 425, 89, 96, 98, 533, 534, 655, 650, 429, 430, 431, 489

[56] References Cited

U.S. PATENT DOCUMENTS

| | | |
|---|---|---|
| 2,571,867 | 10/1951 | Hall et al. . |
| 3,071,475 | 1/1963 | Stohr . |
| 3,732,111 | 5/1973 | Berner et al. . |
| 4,336,272 | 6/1982 | Verrips et al. ........................ 426/250 |
| 4,681,769 | 7/1987 | Bennett, III et al. . |
| 4,832,951 | 5/1989 | Chang-Diaz . |
| 5,422,136 | 6/1995 | Fuisz et al. . |
| 5,487,910 | 1/1996 | Zabel et al. ............................. 426/574 |

FOREIGN PATENT DOCUMENTS

| | | |
|---|---|---|
| 81810180 | 11/1981 | European Pat. Off. . |
| 82111559 | 6/1983 | European Pat. Off. . |
| 87402136 | 4/1988 | European Pat. Off. . |
| 93113120 | 2/1995 | European Pat. Off. . |
| 95103119 | 9/1995 | European Pat. Off. . |
| PCT/US93/ 03000 | 10/1993 | WIPO . |

OTHER PUBLICATIONS

Rustom, I. Y. S. et al. International J. Food Sci. Tech. 30: 773–781, 1995.

Govindarajan, V. S. Critical Rev. Food Sci. Nutrition 17: 1–95, 1982.

*Primary Examiner*—Keith D. Hendricks
*Attorney, Agent, or Firm*—Morse & Altman

[57] ABSTRACT

A process is described for producing natural, heat stable flavorings suitable for bakery applications. The flavorings are produced by low-temperature extraction of at least one herb, spice, fruit, nut or other plant material or part thereof with a mixture or an emulsion of an edible oil, water and an emulsifier, followed by separation of the solids matter from the liquid. The liquid flavorings fraction which is itself heat stable is rendered more convenient to use by encapsulation and drying into powder.

16 Claims, 1 Drawing Sheet

NATURAL HEAT STABLE FLAVORINGS FOR BAKERY APPLICATIONS

This invention concerns the extraction of natural flavorings from plant matter using an improved and cost-effective process and protecting and heat-stabilizing these flavorings for use in bakery applications, as well as the products from these processes themselves and their uses in bakery applications.

BACKGROUND TO THE INVENTION

Rationalization and competition in segmented markets have fuelled the increased use of flavours and flavoring substances in today's food, cosmetics and pharmaceutical industries. Natural flavours or flavorings are generally weaker in performance but offer a better flavour perception compared to synthetic ones and as such are generally preferred. Commercial methods for extracting flavours and flavorings include steam distillation, hydrodiffusion, infusion and enzyme assisted extractions. One drawback to presently produced natural flavorings is the high cost. The methods currently used for the manufacture of flavoring extracts and the solvents employed in extracting them control their desirable natural and sensory properties and also their cost.

Prior art knowledge in extractions of flavorings includes water-based methods such as decoction and infusion, a version of which is described in U.S. Pat. No. 4,832,951 (Chang-Diaz). U.S. Pat. No. 3,732,111 (Berner et al) teaches the use of heated vegetable oil to extract the antioxidant principles of spices. The flavours are subsequently removed by sparging with steam at 175° C. U.S. Pat. No. 4,681,769 (Bennett III et al) teaches the extraction of spice oleoresins at room temperature using edible oil to produce two products; oleoresin extract and fortified edible oil. Prior art knowledge in extractions of flavorings in oils have also been used in the extraction of essential oils. Some processes such as that disclosed by U.S. Pat. No. 2,571,867 (Hall et al) teach the use of essential oil of spice for the extraction of a spice solid. Others such as U.S. Pat. No. 3,071,475 (Stohr) teach the preparation of a suspension of herb powders and flakes in a heated edible oil. Other methods currently available which promise cleaner recovery, such as carbon dioxide extraction, are more costly.

Extraction methods involving the use of chemicals or solvents have drawbacks including thermal degradation or modification of the extract (as occurs with steam distillation, solvent extraction), chemical degradation or modification of the extract (as occurs with hydrodiffusion, infusion and solvent extraction) and the presence of undesirable but inevitable residual solvents in the extracts (as occurs with solvent extraction). Low-temperature enzyme-assisted extractions in water remain characteristically inefficient because the flavours or flavorings produced are generally not completely soluble in water. The extracts produced by the prior methods are mostly the volatile compounds which may only partially represent the total flavoring system in the commodity. However, the non-volatile fractions could be of great importance in the aroma, taste and true fidelity of the plant material. One problem which this invention is intended to solve therefore is to seek to provide a flavoring extract containing both the volatile and non-volatile portions of the commodity flavoring system which does not contain any traces of solvent. In some particular applications, notably cooking and baking some of the flavorings are destabilized or destroyed. One problem therefore which this invention seeks to address is to provide a heat-stable extract.

The method of the present invention is cost efficient, no solvents are used, and the flavorings extracted are stable at the high temperatures normally employed in extrusion and bakery applications. Further stabilization of the flavorings produced by this invention and enhanced convenience in use are attained by encapsulation—encapsulation is an attractive approach to transform liquid flavorings into stable, free flowing powders which are easy to handle and use.

SUMMARY OF THE INVENTION

An object of the present invention is to provide a method for the extraction of flavorings from plant matter for use in bakery applications which provides improved cost efficiency and improved quality and stability in the extract recovered, in comparison to those available through current conventional extractions. As well, the extracted flavorings produced by the present invention are presented in two easy-to-use formats, wet and dry, for commercial or consumer use.

The present invention provides a method of extracting flavorings from fruits, nuts, spices, herbs and other plant parts employing a mixture of water, an edible oil and an emulsifier or their emulsions thereof as the extracting medium, wherein the plant part bearing the flavoring is finely comminuted in the extracting medium and the slurry stirred over a period of time to allow enough contact time, and the non-solubilized solids matter removed from the flavoring extract using a series of extraction and separation steps or by counter-current extraction techniques. The extracted flavorings can then be encapsulated and dried.

The process of the current invention, therefore, ultimately provides two industrially desirable products which can be used in bakery applications; the heat stable liquid and the heat stable dry flavorings. The process also provides spent materials that can be further processed using prior art technology into another flavorings and/or ingredients for human or animal consumption.

DESCRIPTION OF THE PROCESS DIAGRAM

Reference is made to the attached FIG. 1, which represents in a form of a flow diagram embodiments of the process and the stages involved in the process contemplated by the present invention.

DETAILED DESCRIPTION OF THE INVENTION

Figure 1:
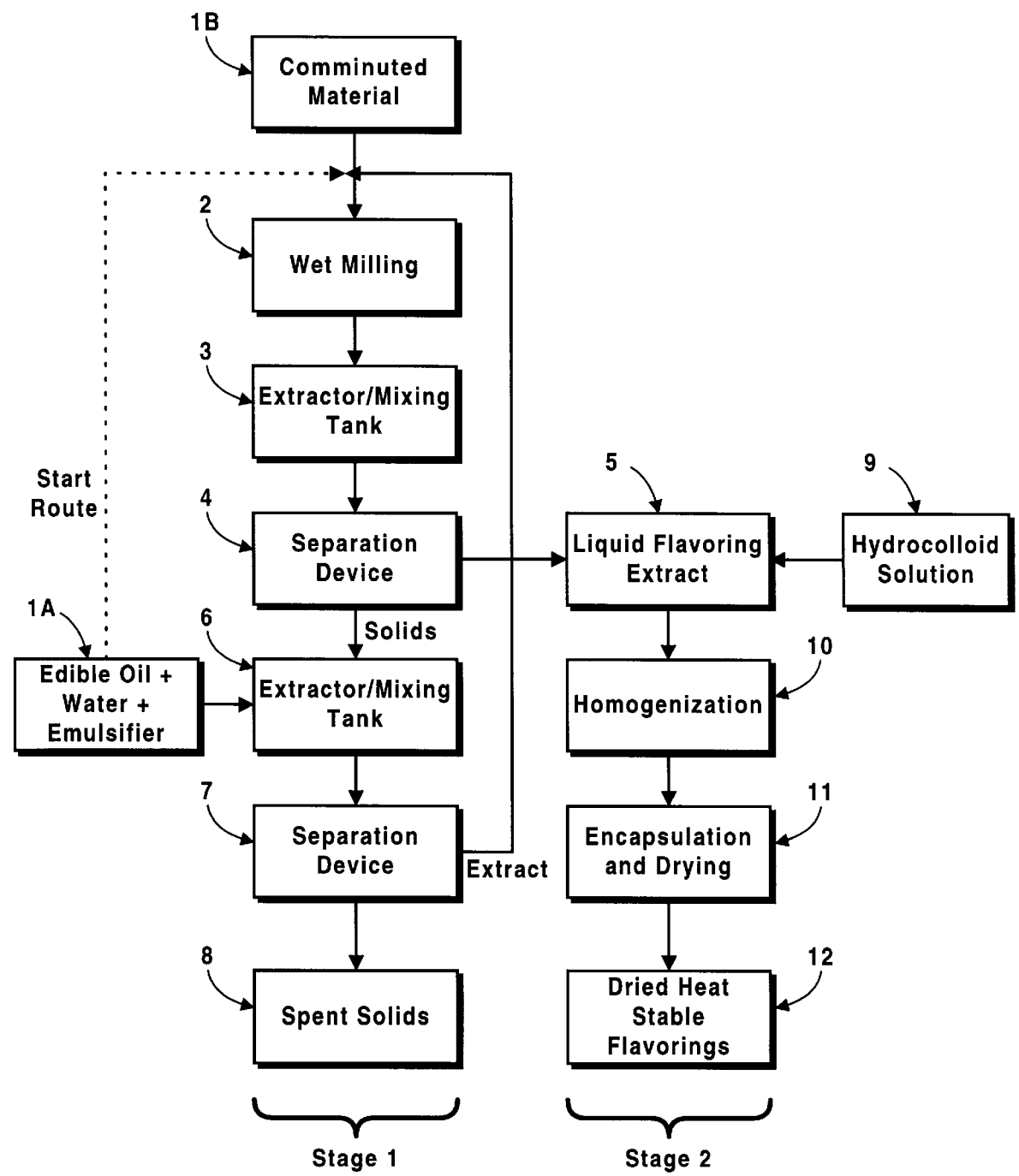

The current invention relates to the process of liquid extraction of flavorings from various plants and parts thereof, and encapsulation of the flavorings into a flowable dry powder.

Referring to FIG. 1, which shows the primary steps in the process, the first stage of the process is the extraction process which is labelled as Stage 1 on the diagram. For use in the extraction process an extraction solution 1A is prepared comprised of a mixture or an emulsion of an edible oil, water and an emulsifier.

The component ratios of the extraction solution 1A by the present invention are within the range of 1:98.9:0.1 to 27:22:1, by weight. The use of an extraction solution 1A comprised of edible oil, water and an emulsifier enhances the extraction of both lipophilic and hydrophilic flavoring components thus the full complement of the flavoring compounds in the plant parts or material is extracted. The edible oil used in the extraction solution 1A is preferably a liquid refined, bleached, deodorized (RBD) vegetable oil. However this does not preclude the use of refined, deodorized edible oils from animal or nut origin or blends of animal, nuts or vegetable oils. The preferred oils are those of high hydrophobicity and include oils from corn, soybean, rapeseed, canola, peanut, olive, safflower and soft fractions of fractionated sunflower oils.

It has been found that lecithin works particularly well as the emulsifier component in the extraction solution 1A, although it will be understood that other emulsifiers could be used within the scope of this invention as well. All ingredients in the extraction and encapsulation of the flavorings are natural and no solvents are used.

The comminuted plant material is prepared 1B, by processing the one or more varieties of plant material to be extracted in a grinder, comminuting mill or the like.

The extraction process is then started by simultaneously feeding the comminuted plant material 1B and the extraction solution 1A into a wet mill 2 or the like. From there the slurry is mixed in the extractor/mixing tank shown at 3 at a constant temperature for a contact period. The constant temperature for the extractions is in the temperature range from 20 to 75 degrees Celsius, and the contact period is in the range from one to 120 minutes.

Following this first extraction/blending, the slurry is separated into a liquid fraction and a solid fraction, at 4. Separation is accomplished by a sieve or filter press or preferably a decanter or basket centrifuge. A type of the preferred decanter centrifuge for the separation of the solids and the liquid is a Westfalia Decanter centrifuge Model CA225-010. The liquid fraction obtained from this first separation is liquid flavorings extract 5 which offers heat stable properties in bakery applications. The remaining solids are prior extracted plant solids.

The prior extracted plant solids then enter the next extractor/mixing tank shown at 6 for a second extraction with a fresh quantity of extraction solution 1A. After the desired contact time has elapsed, the slurry from this tank at 6 is again separated into solid and liquid components, at 7. The liquid extract 7 is recycled for use to extract further fresh comminuted plant material 1B in the wet mill 2.

In any subsequent stages carried out after the start-up in the extraction process, extraction solution 1A is mixed with prior extracted plant solids. Following these supplemental extractions, the liquid extract 7 is used as a feed along with comminuted plant material at 1B into the wet mill at 2. As the comminuted plant material is exhausted, the spent solids 8 remain. The extraction process as shown in the flow diagram illustrates only a two stage counter current extraction mode, however, the invention does not preclude extension of the stages to three or more stages in order to increase the flavoring recovery ratio from the comminuted plant material.

Residual flavorings remain in the spent solids 8 generated from the second or subsequent extractions. This material may be dried or used in applications where reduced potency as a spice or flavoring is desirable. Alternatively, the remaining flavorings in the spent solids may be extracted by prior art conventional extraction methods such as solvent extraction or distillation for use in applications where heat stability is not necessarily desired. The completely deflavoured solids may be a useful source of fibre or animal feed depending on the plant material or part used as input in the extraction.

The extraction process of the current invention is presented as a counter-current extraction process as shown in the flow diagram but does not preclude the practice of the current invention in a sequential batch mode.

Liquid flavorings extracts, shown at 5, have heat-stable properties for use in bakery applications and can be marketed in this liquid form, or can be encapsulated and dried to provide a free-flowing powder as an alternative product presentation.

In the encapsulation Stage 2, the liquid flavorings extract 5 is mixed with a solution of one or more hydrocolloids 9 at a liquid flavorings extract: hydrocolloid solution ratio ranging from 0.5:1.5 to 2:1. The hydrocolloids can be selected from gum arabic, alginate, carageenan, xanthan gum, pectin, carboxymethyl cellulose, gellan gum, modified starches and mixtures thereof. The preferred hydrocolloid solutions are those prepared from gum arabic, alginates, xanthan gum and gellan gums.

This flavoring-hydrocolloid mixture is homogenized 10 in order to encapsulate the flavorings with the hydrocolloid film. Alternatively, the encapsulation 11 could be effected using centrifugal extrusion technique known in the industry to be used for encapsulation purposes. The examples of encapsulation techniques used in the current invention to encapsulate the liquid flavorings extract of the current invention does not preclude the use of centrifugal extrusion process to encapsulate the liquid flavorings extract as produced by the process of the current invention.

The encapsulated flavorings are then dried in a spray, fluidized or dispersion type of a dryer 11 to yield the flowable heat-stable flavoring powder 12.

The current invention is for extracting flavorings from herbs, spices, fruits, nuts and other plant parts used as flavorings—it is particularly contemplated that this process will be used to extract flavorings selected either singly or in a combination from the group hereunder: *Amelanchier alnifolia* (saskatoon berry), *Ananas cosmosus* (pineapple), *Anethum graveolens* (celery), *Anethum graveolens* (dill), *Artemisia dracunculus* (tarragon), *Capsicum annum* (paprika), *Capsicum annuum C. frutescene* (capsicum/chili/red pepper), *Carum carvi* (caraway), Cinnamomum (cassia), cinnamon, Citrus Limon (lemon), *Citrus sinenis* (orange), *Cochlearia armoracia* (horseradish), *Cocos nucifema* (coconut), *Condandrum sativum* (coriander), *Crocus sativus* (saffron), *Cuminum cyminum* (cumin), *Curcuma longa* (turmeric), *Elattaria cardamomum* (cardamon), Foeniculum (fennel), Fragaria (strawberry), *Laurus nobilis* (bay Laurel), *Levisticum officinale* (lovage), *Levisticum offinale* (lovage), *Lippia graveolene* (oregano), *Magnifera indica* (mango), *Majorana hortensis* (marjoram), Malus, *M. sylvestris* (apple), *Menths sps* (mint), Musa (banana), *Myristica fragrane* (mace), *Myristica fragrans* (nutmeg), *Ocimum basilicum* (basil), *Origanum vulgare* (origanum), *Pimenta dioica* (pimento (all spice)), *Pimpinella anisum* (anise), *Piper nigrum* (pepper (black & white)), *Prunus dulcis* (almond), Prunus Persica (peach), Psidium, *P. guineense* (guava), *Rosmarinus officinalis* (rosemary), *Rubus idaeus* (raspberry), *Salva officinalis* (sage, dalmation), *Satureia hortensis* (savory), *Sinapis alba, Brassica hirta, B. nigra* (mustard (black & white)), *Syzygium aromaticum* (clove), *Thymus vulgaris* (thyme), *Trigonelle foenum-graecum* (fenugreek), Vacciniuim (blueberry), and *Zingiber officinale* (ginger). It will be understood that the invention could be practiced on any number of other plant materials as well, and as such those other plants would also be considered to be within the scope of this invention.

The present invention is further illustrated by the following examples which are not intended to limit the effective scope of the claims.

EXAMPLE 1

Production from Star Anise

Two hundred and fifty kilograms (250 kg) of raw star anise was milled into a powder in a hammer mill to yield 240 kg of anise powder. Eighty kilograms (80 kg) of the anise powder was quantitatively mixed with 360 kg of an extraction solution (60° C.) composed of 1% refined, bleached and deodorized (RBD) canola oil, 98.9% soft water and 0.1% lecithin using a solids/liquid blender and pumped into a stirring tank. Stirring was maintained in the closed tank for 10 minutes and the slurry was separated in a Bird decanter centrifuge into a liquid fraction and a solids fraction. The liquid fraction was held in a process tank and quickly cooled to room temperature.

The solids fraction was added to another 360 kg of the extraction solution of the same composition and temperature as the one used in the first extraction in a stirring tank. The mixture was stirred for 10 minutes and separated on a Westfalia decanter centrifuge into yet another two fractions; solids and liquid. The solids fraction was held in a storage tank. The liquid was pumped to the first stir tank where it was mixed with another 80 kg of anise powder using the solids/liquid blender. The temperature was maintained at 60° C. and the slurry mixed for 10 minutes. The slurry was separated on the Bird decanter centrifuge into a solids fraction and a liquid fraction. The liquid fraction was pumped to the stirring tank holding the previously extracted liquid and mixed.

The solids fraction was added to yet another 360 kg of the extraction solution of the same composition and temperature as the previous one in the stirring tank. Mixing was maintained for 10 minutes. The slurry was separated on the Westfalia decanter centrifuge into a liquid fraction and a solids fraction. The solids fraction was added to the one obtained in the first stage. The combined solids fraction was dried and targeted for food application as a mild anise powder condiment.

The liquid fraction was pumped to the first stirring tank wherein another 80 kg of anise powder was blended into the solution at 60° C. Mixing was maintained for 10 minutes and the slurry was separated on the Bird decanter centrifuge into yet another solids fraction and a liquid fraction. The liquid fraction was combined with the previous ones that were held in a stirring tank at room temperature. The pooled liquid fractions were considered as the "liquid flavorings extract." A yield of 840 kg of the liquid flavorings extract was produced. A 40 kg aliquot of the liquid flavorings extract was taken as a sample and kept in the refrigerator for a subsequent heat stability test in bakery products.

The remaining 800 kg of the extract was heated to 40° C. and 16.0 kg of sodium alginate was slowly added while mixing in a stirring tank. Mixing was continued until the sodium alginate had completely dissolved. Meanwhile a 5% calcium solution made with calcium lactate was prepared by dissolving 41.5 kg of calcium lactate in 829.5 kg of soft water at 30° C. The solution was thoroughly mixed until the calcium lactate was completely dissolved. The mixture of the liquid flavorings extract and the sodium alginate was atomized in a rotary atomizer head into the solution of calcium alginate. The liquid flavorings extract alginate droplets turned into solid spherical beads on reaching the calcium lactate solution thereby encapsulating them. The solution with the small atomized beads was concentrated and dried in a Komline-Sanderson spray dryer. The dried flavorings powder was packaged in polyethylene bags and put into fibre drums. The flavour was stored in a cool, dry place.

EXAMPLE 2

Production from Star Anise II

A 36 kilogram sample of star anise was extracted in a counter current mode as described in Example 1 using a total of 228 kg of an extraction solution composed of 32% RBD canola oil, 66.6% soft water and 1.4% lecithin. The total amount of the liquid flavorings extract obtained was 207 kg. The anethole content of the extract was 14.73 mg/mL of the extract. About 7 kg of the extract was kept in a refrigerator for subsequent heat stability tests. The remaining 200 kg was encapsulated in the following manner.

A 200 kg, 25% solution of a gum arabic preparation was prepared in a tank. The 200 kg of liquid flavorings extract and the 200 kg, 25% gum arabic solution were mixed and homogenized for encapsulation. The homogenized slurry was spray dried in a spray dryer manufactured by Niro Atomizer. The yield was 98.7 kg of anise powder. The powder was packed in polyethylene bags in 25 kg lots and stored in sealed fibre drums. They were stored in a cool dry place. 8.7 kg of the powder was used for heat stability studies in bakery products.

The two stage extraction of the kind described in the current invention yields a flavoring extract containing a minimum of 19.75 mg/mL of anethole from the anise and constitutes about 90% of the total anethole in the anise. Anethole accounts for approximately 71% of the flavour of star anise: Bernard et al, "Extraction of essential oils by refining of plant materials II. Processing of products in the dry state; *Illicium verum* Hooker (fruit) and cinnamonum zeylanicum Nees (bark)", (1989) 4 Flavours and Fragrance J. 85.

EXAMPLE 3

Heat Stability Studies for Star Anise Flavorings

The anise flavoring powder produced in Example 2, the liquid flavorings extract and the anise flavorings powder produced in Example 3 were tested for heat stability by incorporating them into a standard dough that yields 4 lb of pizza crust. The formula for the dough, preparation and baking at 343° C. (650° F.) for 10 minutes were done in an independent laboratory under industrial setting. The heat stability of the flavorings in the pizza dough and crusts was determined by measuring the percent residual anethole in the; 1) dough before baking, 2) in the crusts after baking, 3) after reheating the crusts in a conventional oven at 232° C. for 7.5 minutes and 4) after reheating the crusts in a microwave oven for 30 seconds. The internal temperature of the crusts after microwave heating reached 90° C.

In all cases over 60% of the active component of the flavorings was retained even after microwave reheating. The residual amounts of the flavorings in each of the crusts were judged to be sensorily perceptible based on sensory test. The flavorings were proved to is be heat stable under industrial bakery conditions. No off-flavours were detected in the flavoured pizza crusts in a laboratory organoleptic evaluation. The results of the analysis are shown below.

| Product | $\mu$g Anethole/g dry | % Anethole vs. Dough | % Anethole vs. Baked Crust |
|---|---|---|---|
| Heat Stability of Anise Flavour | | | |
| Gum Arabic Encapsulated Powder | | | |
| Dough | 6,230 | 100 | — |
| Baked (343° C.) | 4,305 | 69 | 100 |
| Oven reheated | 4,290 | 69 | 99.6 |
| Microwaved | 3,357 | 54 | 78 |

-continued

Heat Stability of Anise Flavour

| Product | µg Anethole/g dry | % Anethole vs. Dough | % Anethole vs. Baked Crust |
|---|---|---|---|
| Liquid flavorings extract | | | |
| Dough | 4,679 | 100 | — |
| Baked (343° C.) | 4,208 | 90 | 100 |
| Oven reheated | 4,035 | 86 | 95.9 |
| Microwaved | 3,184 | 68 | 75.7 |
| Ca-alginate Encapsulated Powder | | | |
| Dough | 4,199 | 100 | — |
| Baked (343° C.) | 2,545 | 61 | 100 |
| Oven reheated | 1,933 | 46 | 76 |
| Microwaved | 1,724 | 41 | 67.7 |

EXAMPLE 4

Production from Spearmint

Approximately 45 kg of dry mint was partially rehydrated in 180 kg of water at 70° C. for 7.5 minutes in a stir tank extractor. 200 kg of extracting solution composed of 32%. RBD canola oil, 1.4% of lecithin and 66.6% soft water and at 70° C. was added to the mint slurry. The slurry was mixed for 10 minutes. The slurry was separated into the solids fraction and the liquid fraction in a Westfalia decanter centrifuge. The liquid fraction was kept in a resting tank.

The solids fraction was added to another 200 kg of the extraction solution of the same composition and temperature as the first. The slurry was stirred for 10 minutes. The slurry was separated again in a Westfalia decanter centrifuge into the solids and liquids fractions. The solids fraction was dried and packaged for a potential food application.

The liquid fraction was combined with the one from the first extraction to yield a total of 445.1 kg of a liquid flavorings extract from mint. An equal weight (445.1 kg) of 20% gum arabic solution was added to the liquid flavorings extract and mixed. The mixture was homogenized and thereafter spray dried on a Komline-Sanderson spray dryer. The yield of powder was 100.4 kg. The mint flavorings powder was packaged in polyethylene bags in 25 kg lots and inserted into fibre drums. They were stored in a cool dry place.

EXAMPLE 5

Production of a Raspberry Flavorings Powder 150 kg of raspberries were macerated in a mill and transferred into a stirring extraction tank. To this was added 600 kg of the extraction solution composed of 402 kg soft water (67%), 192 kg of RBD canola oil (32%) with 200 ppm ascorbyl palmitate as stabilizer and 6 kg (1%) of lecithin, was added. The extraction solution was at 70° C. The content of the tank was stirred for 10 minutes and the slurry was separated on a Westfalia decanter centrifuge into a solids and a liquid fractions. The solids fraction was dried and kept for future food applications. The amount of the liquid flavorings extract obtained from the raspberries was 617 kg.

Encapsulation of the liquid flavorings extract was accomplished by mixing it with a 617 kg solution (20%) of gum arabic. The mixture was homogenized at 30° C. and spray dried on the Komline-Sanderson spray dryer. The yield of powder was 103.8 kg. The raspberry flavorings powder was packaged in polyethylene bags in 25 kg lots and stored in fibre drums in a cool, dry place.

EXAMPLE 6

Production of a Garlic Flavorings Powder 105 kg of garlic cloves were extracted in a counter-current mode as described in Example 1. The feed in each stage was 35 kg. The extraction solution used for each of the 35 kg lots was 120 kg and was composed of 33.6 kg of RBD canola oil (28%), 84.4 kg of soft water (27.3%) and 1.7 kg of lecithin (1.4%) heated to 30° C. The garlic cloves were chopped in a Hobart chopper and wet milled with the extraction solution in a Fitzpatrick comminuting mill to begin the extraction. The milled garlic was pumped into an extraction/mixing tank. The contact time in the extraction tank was 5 minutes. The yield of the liquid flavorings extract from the garlic cloves was 195 kg.

Encapsulation of the liquid flavorings extract was accomplished by mixing the liquid flavorings extract from the garlic with a 20% solution of gum arabic (195 kg) and mixed well. The mixture was homogenized for encapsulation. The encapsulated mixture was spray dried using the Komline-Sanderson spray dryer. The yield of the flavorings obtained was 110.3 kg. The garlic flavorings powder was packaged in 10 kg lots in polyethylene bags and stored in fibre drums in a cool, dry place.

About 2 g of the garlic flavorings powder was incorporated in a dough for making a standard 12 inch pizza. The pizza dough was baked at 400° F. for 30 minutes and sliced into four quadrants. One of the quadrants was subjected to organoleptic assessment a few minutes after baking. Two quadrants were cooled in a refrigerator. One was reheated in a conventional oven for 7.5 minutes. and the other in a microwave oven for 30 seconds. Both were subjected to a similar organoleptic assessment using the same respondents. In all the samples, the garlic flavorings was very perceptible in a form similar to those obtained from freshly crushed garlic cloves. The test confirmed the stability of the garlic flavorings powder in bakery products prepared at high temperatures.

In another stability test, approximately 4 g of the garlic flavorings powder was incorporated in 450 g of Focaccia bread dough. The dough was baked at 400° F. for 15 minutes and then evaluated by a sensory panel of five for the intensity of the garlic flavour in the baked bread compared to that of the unbaked bread. Results from the respondents indicated an almost identical intensity and fidelity of the flavours in both products. The results of the test further attested to the heat stability of the garlic flavorings powder produced according to the process of the current invention.

EXAMPLE 7

Production of Blueberry Flavorings Powder

About 62.5 kg of blueberries were extracted, similarly as described in Example 5, with 250 kg of an extraction solution composed of 80 kg of RBD canola oil with 200 ppm ascorbyl palmitate, 167.5 kg of soft water and 2.5 kg of lecithin. The yield of the blueberry flavoring extract was approximately 260 kg. Part of the liquid flavorings extract was retained for heat stability test.

Encapsulation of the liquid flavorings extract was accomplished by preparing a 25% gum arabic solution at 30° C. The gum solution was mixed with the liquid flavorings in a 1:1 ratio. The mixture was homogenized for encapsulation.

The homogenate was spray dried to yield 105 kg of powder. The powder was packaged and stored in a cool, dry place.

EXAMPLE 8

Heat Stability Test for Blueberry Flavorings

The chemical index used for the blueberry flavorings stability evaluation was the residual linalool in the product. The liquid flavorings extract and the blueberry flavorings powder were functionally evaluated in a muffin application. The evaluation was performed in a commercial setting. The linalool contents in the dough before baking, in the muffins after baking, in the muffins after reheating in an oven and after reheating in a microwave oven were determined. The results are presented below:

| Product | μg Linalool/g dry | % Linalool vs. Dough | % Linalool vs. Baked Muffin |
|---|---|---|---|
| Heat Stability of Blueberry Flavorings | | | |
| Blueberry Flavorings Powder | | | |
| Dough | 1,131 | 100 | — |
| Baked (450° F.) | 1,082 | 95.6 | 100 |
| Oven reheated | 981 | 86.7 | 90.7 |
| Microwaved | 834 | 73.7 | 77.1 |
| Liquid flavorings extract | | | |
| Dough | 1,330 | 100 | — |
| Baked (450° F.) | 1,109 | 83.4 | 100 |
| Oven reheated | 1,109 | 83.4 | 100 |
| Microwaved | 909 | 68.4 | 82 |

The data indicated that over 70% of the active component of the blueberry flavorings was retained even after microwave reheating. The results are a further proof that flavorings produced by the process of the current invention are remarkably stable in bakery applications.

The number of bakery applications given in the examples for the flavorings prepared according to this invention have been limited. It is not conceivable to provide examples for each bakery application in this patent. Such limitations are not to be regarded as a so departure from the embodiment and scope of the invention and all bakery applications are intended to be included within the scope of the following claims:

We claim:

1. A process for preparing a liquid flavoring extract comprising the steps of:
    a) providing a plant material comprising a flavoring;
    b) mixing an edible oil with water in the presence of an emulsifier to form an oil/water emulsion;
    c) extracting the plant material with the oil/water emulsion to extract the flavoring into the oil/water emulsion; and,
    d) removing the non-solubilized plant material from the oil/water emulsion to provide the liquid flavoring extract.

2. The process of claim 1 wherein the plant material is selected from the group consisting of *Amelanchier alnifolia* (saskatoon berry), *Ananas cosmosus* (pineapple), *Anethum graveolens* (celery), *Anethum graveolens* (dill), *Artemisia dracunculus* (tarragon), *Capsicum annum* (paprika), *Capsicum annuum C. frutescene* (capsicum/chilitred pepper), *Carum carvi* (caraway), Cinnamomum (cassia), cinnamon, Citrus Limon (lemon), *Citrus sinenis* (orange), *Cochlearia armoracia* (horseradish), *Cocos nucifema* (coconut), *Coridandrum sativum* (coriander), *Crocus sativus* (saffron), *Cuminum cyminum* (cumin), *Curcuma longa* (turmeric), *Elaffaria cardamomum* (cardamon), Foeniculum (fennel), Fragana (strawberry), *Laurus nobilis* (bay Laurel), *Levisticum officinale* (lovage), *Levisticum offinale* (lovage), *Lippia graveolene* (oregano), *Magnifera indica* (mango), *Majorana hortensis* (marjoram), Malus, *M. sylvestris* (apple), *Menths sps* (mint), Musa (banana), *Myristica fragrane* (mace), *Myristica fragrans* (nutmeg), *Ocimum basilicum* (basil), *Origanum vulgare* (origanum), *Pimenta dioica* (pimento (all spice)), *Pimpinella anisum* (anise), *Piper nigrum* (pepper (black & white)), *Prunus dulcis* (almond), Prunus Persica (peach), Psidium, *P. guineense* (guava), *Rosmarinus officinalis* (rosemary), *Rubus idaeus* (raspberry), *Salva officinalis* (sage, dalmation), *Satureia hoffensis* (savory), *Sinapis alba, Brassica hirta, B. nigra* (mustard (black & white)), *Syzygium aromaticum* (clove), *Thymus vulgaris* (thyme), *Trigonelle foenum-graecum* (fenugreek), Vaccinium (blueberry), and *Zingiber officinale* (ginger).

3. The process of claim 1 wherein the plant material is selected from the group consisting of star anise powder, mint, macerated raspberries, comminuted garlic, and macerated blueberries.

4. The process of claim 1 wherein the plant material is comminuted.

5. The process of claim 1 wherein the oil is a refined, bleached, deodorized vegetable oil.

6. The process of claim 1 wherein the oil is selected from the group consisting of corn oil, soybean oil, rapeseed oil, canola oil, peanut oil, olive oil, safflower oil, and soft fractions of fractionated sunflower oils.

7. The process of claim 1 wherein the emulsifier is lecithin.

8. The process of claim 1 wherein the relative weights of the edible oil, the water and the emulsifier in the oil/water emulsion are within the range of 1:98.9:0.1 to 27:22:1 (oil:water:emulsifier).

9. The process of claim 1 wherein the extracting step is carried out at a temperature of between about 20° C. and about 75° C.

10. The process of claim 1 wherein the extracting step is carried out for a period of between about one minute and about 120 minutes.

11. The process of claim 1 wherein the extracting step is carried out as a multi-step, counter-current extraction process.

12. The process of claim 1 further comprising the steps of encapsulating and drying the liquid flavoring extract to provide a dry flavoring powder.

13. The process of claim 12 wherein the encapsulating step comprises mixing the liquid flavoring extract with a hydrocolloid.

14. The process of claim 13 wherein the ratio of the liquid flavoring extract to the hydrocolloid in the encapsulating step is in the range of about 0.5:1.5 to about 2:1.

15. The process of claim 13 wherein the hydrocolloid is selected from the group consisting of gum arabic, alginates, carageenan, xanthan gum, pectin, carboxymethyl cellulose, gellan gum, modified starches, and mixtures thereof.

16. The process of claim 13 wherein the hydrocolloid is selected from the group consisting of gum arabic, alginates, xanthan gum, and gellan gums.

* * * * *